United States Patent Office

3,102,804
Patented Sept. 3, 1963

3,102,804
FERTILIZER AND METHOD OF PRODUCING THE SAME
Ludwig Engelhart, 12 Johann-Clanze-Strasse, Munich 25, Germany
No Drawing.  Filed May 1, 1961, Ser. No. 106,525
3 Claims.  (Cl. 71—10)

The present invention relates to a dust-free fertilizer, more particularly, to a method of producing a dust-free commercial fertilizer of high quality from organic and mineral fertilizers.

It has long been known that a high quality fertilizer, particularly of the type which is intended to be used for garden mould, must contain a large proportion of inorganic substances. Fertilizers in concentrated form have been produced for a long time dating from approximately the time of publication of the book "Science of Fertilizers," by Justus von Liebig. This type of fertilizers are commercially designated as "commercial fertilizers."

It has also been known that animal waste matter is particularly beneficial to the growth of plants. Accordingly, many and continuous efforts have been made to produce commercial fertilizers from animal refuse such as bones, horn, blood and the like.

The bone or horn powders or meals which were employed in producing these fertilizers were subjected to a complicated treatment which essentially comprised the addition of heat for the purpose of dressing these powders. Blood was either used in the fresh state or, after the elimination of the fibrin substances, admixed to inorganic salts such as phosphates, carbonates, nitrates, sulfates and silicates.

In contrast to and to distinguish from the mineral commercial fertilizers such fertilizing products which contained bones, horn or blood were designated as "organic commercial fertilizers." One of the main disadvantages of these organic commercial fertilizers was that these fertilizers were not dustfree and that any quantity of such fertilizers contained a large quantity of dust which dust was not fully employed in the fertilizing operation. In order to obtain a most effective fertilizing effect these organic fertilizers were pulverized to the highest degrees of fineness. It is apparent, however, that the finer the pulverization or grinding of bony or horny substances, the more susceptible are these substances to produce dust. Such fertilizers have been produced from bone or horn which are as fine as meal and in some cases have a powder consistency.

In applying such fertilizers by scattering of the same on the ground, the slightest movement of air will convey the dust from the fertilizer away from the area which is to be fertilized. Thus, a considerable percentage of the fertilizer cannot be used as a fertilizer since this percentage comprises dust which is carried away by natural movement of the air.

In addition, the considerable quantities of dust in this fertilizer introduces difficulties in the handling of such fertilizers both in the packaging of the same and in applying the fertilizer to the ground. As a result, the possibility that personnel handling these fertilizers may suffer ill-effects from the inhalation of the dust reduces the more general use of these fertilizers even though it is recognized that such fertilizers have outstanding fertilizing properties. In addition, the use of these fertilizers is not economical since a certain percentage thereof is wasted when the powder portion is blown away.

With respect to mineral fertilizers it has been attempted to render such fertilizers dust-free so that they can be readily scattered on the ground by forming the fertilizers in granular form or by applying an oil to them. However, it has been found that when horn or bone meals are oiled or have fatty substances applied to them the result is a clotted mass which cannot readily be scattered onto the ground. In addition, the presence of the fatty substances in the fertilizers produces detrimental effects on the soil.

It is therefore the principal object of this invention to provide an effective, dust-free organic fertilizer and a process of making the same.

It is another object of this invention to provide a more effective process for the production of organic fertilizers.

The fertilizer of this invention is essentially produced by binding a pulverized horn or bone with blood from freshly slaughtered animals. This is accomplished by mixing the pulverized bone or horn meals into a paste while adding a quantity of fresh blood thereto so as to produce a crumbly mass. The crumbly mass is then piled in heaps and left to ferment.

The quantity of fresh blood which is to be added depends essentially on the degree of fineness and the absorption capacity of the pulverized products. This quantity of blood, however, preferably ranges from 5 to 25% of the total quantity of the pulverized products. Numerous experiments and series of tests were conducted in order to determine the proper quantity of blood which should be added and also to ascertain that the addition of blood would produce the dust-free fertilizer. It could not be foreseen and it was unexpected that the addition of a determined quantity of fresh blood would render such an organic fertilizer dust-free.

The results of this invention can be obtained only by using fresh blood from slaughtered animals. The entire, whole blood should be used and not meerly blood refuses. It appears that the fibrin substances which are contained in the whole, fresh blood are efficient binders which prevent the formation of dust in the fertilizer.

After the bone or horn meals have been thoroughly mixed with the fresh blood so as to form a crumbly mass, this mass is heaped so as to be subjected to an anerobic fermentation which produces temperatures of up to 70° C. This fermentation also produces drying of the substance. Upon completion of the fermentation of the dust-free fertilizing mass can be packaged in cardboard cartons, sacks or by any other suitable packaging operation.

It is pointed out that by a fermentation of the bone or horn powders under the addition of fresh blood the vegetable nutrients in the initial substances, i.e. bone or horn meals, which nutrients are, for example, nitrogen and phosphoric acid compounds, are transformed into compounds which are more readily absorbed by plants. It is known that nitrogen and phosphoric acid compounds are only slowly absorbed by the plants. The fertilizer resulting from this process makes it possible to develop organic fertilizers with the highest degree of fineness which, accordingly, have a maximum fertilizing effect. However, these fertilizers are dust-free. It is noted that the fine dust which is formed during the grinding of bone and horn meals can be used in the fertilizer while practising the process of this invention. Previously, this fine dust had to be discarded. Thus, the use of this dust represents another economical feature of this invention.

Any other organic or mineral commercial fertilizers can be added to the mixtures produced according to this invention. The result will be dust-free mixed fertilizers.

In order to illustrate the present invention several specific examples are disclosed which examples do not limit the invention but merely serve to illustrate the process.

*Example I*

150 kilograms of finely pulverized horn and 200 kilograms of finely pulverized bone are mixed in a mixing drum. 50 kilograms of fresh slaughter blood are added to this mixture and during the addition of the blood the mixture is stirred into a paste until a crumbly mass results. The crumbly mass will form after a few minutes. when a suitable mixing apparatus is employed. The mixed crumbly mass is then discharged from the drum, piled into a heap and left to be subjected to an anerobic fermentation. During the fermentation process temperatures of up to 70° C. are produced which temperatures simultaneously dry the mixed mass.

*Example II*

150 kilograms of horn meal and 150 kilograms of bone meal are mixed with 50 kilograms of potassium salt and about 50 kilograms of fresh slaughter blood. The mixture is then treated as described in Example I. This produces a dust-free mixed fertilizer.

It is possible, according to the preesnt invention, to pile subsequent batches of the crumbled mass onto a single heap until a quantity of approximately 100 tons of the mass is piled. The fermentation process will be accelerated in proportion to the height of the heap. After completion of the fermentation process the crumbly mass which is no longer dusty is then suitably packaged for dispatching to the user.

Thus it can be seen that the present invention provides a simple yet effective process of producing a dust-free commercial organic fertilizer. The resultant fertilizing composition is more economical to use because no waste occurs due to the formation of dust during the scattering of the fertilizer.

It will be understood that this invention is susceptible to further modification and, accordingly, it is desired to comprehend such modifications within this invention as may fall within the scope of the appended claims.

What I claim is:

1. A process for the production of a dust-free organic fertilizer, which process comprises the steps of: (1) mixing a composition consisting essentially of whole, fresh slaughterhouse blood, and at least one pulverized material selected from the group consisting of natural bone meal and natural horn meal; (2) heaping said mixed mass; and (3) anaerobically fermenting said heaped mass to produce temperatures up to 70° C., thereby drying the mixed mass, whereby the resultant product is a dry, dust-free organic fertilizer.

2. The process of claim 1 wherein the blood is present in the composition in an amount equal to 5–25% of the pulverized material.

3. The process of claim 1 wherein both natural bone meal and natural horn meal are present in the composition.

References Cited in the file of this patent

UNITED STATES PATENTS 28,516  Stephens _____ May 29, 1960

OTHER REFERENCES

Bruttina, "Uses of Waste Materials," P. S. King & Son, Westminster, 1923, *pages* 246–250 and 254. (Copy in Div. 59.)